(12) United States Patent
Purdy et al.

(10) Patent No.: US 11,821,139 B2
(45) Date of Patent: Nov. 21, 2023

(54) APPROACH TO BIOMASS DELIGNIFICATION

(71) Applicant: SixRing Inc., Calgary (CA)

(72) Inventors: Clay Purdy, Medicine Hat (CA); Markus Weissenberger, Calgary (CA); Markus Pagels, Calgary (CA); Kyle G Wynnyk, Calgary (CA); Matthew Dewit, Calgary (CA); Andrew M Corbett, Calgary (CA)

(73) Assignee: SixRing Inc., Calgary (CA)

( * ) Notice: Subject to any disclaimer, the term of this patent is extended or adjusted under 35 U.S.C. 154(b) by 0 days.

(21) Appl. No.: 17/405,031

(22) Filed: Aug. 18, 2021

(65) Prior Publication Data

US 2022/0186436 A1 Jun. 16, 2022

(30) Foreign Application Priority Data

Dec. 11, 2020 (CA) .................................. CA 3102541

(51) Int. Cl.
*D21C 3/04* (2006.01)

(52) U.S. Cl.
CPC ...................................... *D21C 3/04* (2013.01)

(58) Field of Classification Search
CPC .......... B41J 11/007; B41J 11/20; B41J 13/12; B65H 5/025; B65H 5/026; B65H 2301/4212; B65H 2301/42322; B65H 2403/942; B65H 2404/6112; B65H 2404/63; B65H 2404/632; B65H 2405/3321; B65H 2701/1916; B65H 2801/78; B65H 29/14; B65H 29/52; B65H 29/58; B65H 31/02; B65H 3/063; B65H 5/062; B65H 5/36; B41L 45/06; B41L 47/24; G07B 17/00467; G07B 17/00508; G07B 2017/00491; G07B 2017/00516; G07B 2017/0062; D21C 1/04; D21C 3/04; D21C 3/20; Y02E 50/10; Y02P 20/143; Y02W 30/62

See application file for complete search history.

(56) References Cited

U.S. PATENT DOCUMENTS

| | | | | |
|---|---|---|---|---|
| 5,474,654 A | * | 12/1995 | Mendiratta | D21C 9/14 162/53 |
| 2012/0111714 A1 | * | 5/2012 | Court | C10G 1/086 202/84 |
| 2014/0069599 A1 | * | 3/2014 | Bryant | D21C 9/1005 162/77 |

FOREIGN PATENT DOCUMENTS

WO WO-2018197222 A1 * 11/2018 ............... B27N 1/00

* cited by examiner

*Primary Examiner* — Ellen M McAvoy
*Assistant Examiner* — Chantel L Graham
(74) *Attorney, Agent, or Firm* — FisherBroyles, LLP; James W. Hill; Andrew K. Gonsalves

(57) ABSTRACT

Method of delignification of plant material, said method comprising:
  providing said plant material comprising cellulose fibres and lignin;
  exposing said plant material requiring to a composition comprising:
    an acid;
    a modifiying agent selected from the group consisting of: sulfamic acid; imidazole; N-alkylimidazole; taurine; a taurine derivative; a taurine-related compound; alkylsulfonic acid; arylsulfonic acid; triethanolamine; and combinations thereof;
    a metal oxide; and
    a peroxide;
for a period of time sufficient to remove substantially all (at least 80%) of the lignin present on said plant material.

24 Claims, No Drawings

APPROACH TO BIOMASS DELIGNIFICATION

FIELD OF THE INVENTION

The present invention is directed to a method of biomass delignification, more specifically to the use of a metal oxide catalyst in the delignification of a lignocellulosic feedstock.

BACKGROUND OF THE INVENTION

Fossil fuel-based organic products include a vast array of end use and precursor products such as surfactants, pharmaceuticals, plastics, fuels, polymers, aromatic monomers and elastomers which are abundant in all aspects of manufacturing consumer products and fuels which are used in all aspects of the global economy. Climate change, environmental and political pressures are forcing industry to find alternatives to fossil fuels and petroleum-based products that are carbon-neutral, renewable and economic. A well-known source of many commercialized previously fossil-fuel based products is lignocellulosic biomass, but there is yet a scalable, economical process to extract these valuable constituents to be developed. Lignin is the second most abundant biopolymer of lignocellulosic biomass after cellulose. Lignocellulose is the single most abundant source of carbon-neutral organic materials on the planet and contains most of the required compounds to sustain multiple industries including, but not limited to, energy production, chemicals, food, pharmaceuticals, high strength construction materials, various manufacturing and agriculture applications.

There are billions of tons of lignocellulosic biomass being produced by biosynthesis every year. However, economical and scalable processes to efficiently separate the three components (cellulose, hemicellulose and lignin) of lignocellulosic biomass prove to be a challenge. In order for lignocellulosic biomass to be a strong and legitimate competitor or potentially a complete alternative to petroleum-based products, new processes and chemical treatments need to be developed, such as those taught in this patent. To benefit from lignocellulosic biomass and to be able to further utilize it in industry, one must be able to separate the lignin from the hemicellulose and the cellulose in an economical, commercially viable process that retains all three components in a high purity state for further processing versus the processes now being utilized in scale that destroy or damage many of the valuable individual components. Cellulose is the most abundant organic polymer on earth. It is high molecular weight, possesses great strength, has high biodegradability and is sustainable. Depending on the feedstock, cellulose can make up from 40 to 60 percent of the plant material and is found in trees, forestry residue, algae, crops, various plants, municipal and industrial waste.

Furthermore, due to the strong bonding between cellulose and lignin and hemicellulose, the efficient and commercially viable extraction of the cellulose will depend greatly on the method and biomass source being utilized during the extraction process. Many current and proposed processing methods may limit the use or alter the structural integrity of the cellulose resulting in a marginal yield and excessive processing costs with limited scalability. Most commercial processes begin with already processed pulp, generally from the Kraft process which degrades the biomass in some aspects and requires massive inputs of energy in the form of heat and pressure while producing large amounts of pollution and waste by-products. A process that requires minimal input of energy and greatly reduced capital expenditures for processing facilities or is able to utilize existing infrastructure is highly desirable. In addition, processes that can utilize feedstock that does not require pre-treatment or processing, other than general cleaning/milling, is highly desirable.

It is widely agreed by industry and governments that the technical and commercial challenges with the current known and commercialized processes, which are inefficient, expensive and difficult to scale with regards to direct separation of lignin and hemicellulose from the cellulose in the biomass are what prevents such known technology from being a viable, cost effective alternative for petroleum-based or fossil fuel products on a global scale or even a localized viable scale. In addition, the industrial demand for many of the yieldable materials, such as micro-crystalline cellulose (MCC) or nano-crystalline cellulose (NCC), is substantial if it can be produced in an economical manner. This demand comes from industries that include, but are not limited to, pharmaceuticals, food production, cosmetics, manufacturing, chemicals and fuels production. Many of the aromatic hydrocarbon molecules yielded from biomass can be utilized or processed using much of the current oil & gas global infrastructure such as pipelines, processing facilities, upgraders, along with downstream assets such as gas stations once the biomass has been converted to common fuels. This makes woody biomass the only real alternative to hydrocarbons as the next source of energy and base chemicals for the human race that is arguably carbon-neutral or close to carbon-neutral, and that would likely utilize much of the current global mid-stream and down-stream energy assets in use resulting in the retention of many millions of jobs with minimal economic disruption. Much of these multi-trillion-dollar assets and many millions of jobs globally would be lost with other alternative energy sources such as solar, hydrogen or wind. A viable source of energy from woody biomass would also make the internal combustion and jet engines carbon-neutral, thus retaining other global trillion-dollar industries with minimal interruption such as the airline industry, the automotive industry and the many hundreds of ancillary support industries.

The first step in paper production, and most energy-intensive step, is the production of pulp. This is one of the current few large and mature sources of cellulosic material, although it is very inefficient, polluting and energy intensive. Notwithstanding water, wood and other plant materials used to make pulp contain three main components: cellulose, lignin, and hemicellulose. Pulping has a primary goal to separate the cellulose fibres from the lignin. In general, cellulose extracted from plant materials contains both an amorphous region and a crystalline region. Lignin is a three-dimensional crosslinked polymer which figuratively acts as a mortar or binding agent to hold all the fibres together within the plant. Its presence in finished pulp is undesirable and adds no industrial value to the finished product. Pulping wood refers to breaking down the bulk structure of the fibre source, be it chips, stems or other plant parts, into the constituent fibres. The cellulose fibres are the most desired component with regards to paper manufacturing. Hemicelluloses are shorter branched carbohydrate polymers consisting of various monosaccharides which form a random amorphous polymeric structure. The presence of hemicellulose in finished pulp is also regarded as bringing no value to a paper product. This is also true for biomass conversion. The challenges are similar, only the desired outcome and constituents are different. Optimal biomass conversion would have the further breakdown to monosaccharides as a desired outcome, while the common pulp & paper processes normally stop right after lignin dissolution. With the process taught in this patent there would be many additional valuable constituents including, but not limited to microcrystalline cellulose (MCC), nanocrystalline cellulose (NCC) and cellulose nanofibres (CNF) along with other valuable commercial products yielded from the process effluent such as aromatic monomers.

There are two main approaches to processing wood pulp or woody biomass: mechanical treatment and chemical treatment. Mechanical treatment or pulping generally consists of mechanically tearing the biomass feedstock apart and, thus, tearing cellulose fibres apart in an effort to distinctly separate them from each other for further processing. The shortcomings of this approach include: damaged or broken cellulose fibres, thus shorter fibres, and lignin being left on the cellulose fibre,s thus being inefficient or non-optimal for most commercial applications without further, expensive processing. The current process also consumes large amounts of energy, is polluting, and is capital intensive. There are several approaches included in chemical pulping. These are generally aimed at the depolymerization of the lignin and hemicellulose into small, water-soluble molecules. These now degraded or processed components can be separated from the cellulose fibres by washing the latter without depolymerizing the cellulose fibres. The current, globally commercialized chemical process is energy intensive, requiring high amounts of heat and/or high pressures; in many cases, agitation or mechanical intervention are also required, further adding inefficiencies and costs to the process. With this process much of the effluent is waste product.

There exist pulping or treatment methods which combine, to a various extent, the chemical aspects of pulping with the mechanical aspects of pulping. To name a few, one must consider thermomechanical pulping (also commonly referred to as TMP), and chemi-thermomechanical pulping (CTMP). Through a selection of the advantages provided by each general pulping method, the treatments are designed to reduce the amount of energy required by the mechanical aspect of the pulping treatment. This can also directly impact the size, shape, and tensile strength of the fibres subjected to these combination pulping approaches and thus the commercial viability. Generally, these approaches involve a shortened chemical treatment time (compared to conventional exclusive chemical pulping) which is then typically followed by mechanical treatment to separate the fibres.

The most common process to make pulp for paper production is the Kraft process. In the Kraft process, wood chips are converted to wood pulp which is almost entirely pure cellulose fibres. The multi-step Kraft process consists of a first step where wood chips are impregnated/treated with a chemical solution. This is done by soaking the wood chips and then pre-heating the wood chips with steam. This step swells the wood chips and expels the air present in the wood chips and replaces the air with the treatment liquid. This produces black liquor, a resultant by-product from the Kraft process. It contains water, lignin residues, hemicellulose and inorganic chemicals. White liquor is a strong alkaline solution comprising sodium hydroxide and sodium sulfide. Once the wood chips have been soaked in the various chemical solutions, they undergo cooking. To achieve delignification in the wood chips, the cooking is carried out for several hours at temperatures reaching up to 176° C. At these temperatures, the lignin degrades to yield water soluble fragments. The remaining cellulosic fibres are collected and washed after the cooking step.

U.S. Pat. No. 5,080,756 teaches an improved Kraft pulping process and is characterized by the addition of a spent concentrated sulfuric acid composition containing organic matter to a Kraft recovery system to provide a mixture enriched in its total sulfur content that is subjected to dehydration, pyrolysis and reduction in a recovery furnace. The organic matter of the sulfuric acid composition is particularly beneficial as a source of thermal energy that enables high heat levels to be easily maintained to facilitate the oxidation and reduction reactions that take place in the furnace, thus resulting in the formation of sulfide used for the preparation of cooking liquor suitable for pulping.

Caro's acid, also known as peroxymonosulfuric acid ($H_2SO_5$), is one of the strongest oxidants known and can be explosive in its pure form. There are several known reactions for the preparation of Caro's acid but one of the most straightforward involves the reaction between sulfuric acid ($H_2SO_4$) and hydrogen peroxide ($H_2O_2$). Preparing Caro's acid in this method allows one yield in a further reaction of potassium monopersulfate (PMPS) which is a valuable bleaching agent and oxidizer. While Caro's acid has several known useful applications, one noteworthy is its use in the delignification of wood. But because of its reactivity and dangers associated therewith, it is not a preferred approach to treat large volumes of material such as lignocellulosic biomass or feedstock.

Other methods have been developed for pretreating lignocellulosic feedstocks. These pretreatment methods include dilute acid pretreatment, steam explosion ($CO_2$ explosion), pH-controlled water pretreatment, ammonia fibre expansion, ammonia recycle percolation (ARP), and lime pretreatment (Mosier et al. 2005; Wyman et al. 2005; Yang and Wyman 2008). One approach involves the concept of organosolv. Organosolv pulping is the process to extract lignin from lignocellulosic feedstocks with organic solvents or their aqueous solutions. Organosolv pulping has attracted interest since the 1970's because the conventional pulping processes, Kraft and sulfite processes, have some serious shortcomings such as air and water pollution. Organosolv pretreatment is similar to organosolv pulping, but the degree of delignification for pretreatment is not expected/required to be as high as that of pulping. However, a drawback of organosolv pre-treatment is the high temperatures at which the processes are known to be carried out at, upwards of 100-250° C., often times in the range of 185-210° C. Such temperatures require high energy inputs.

Improved processes for delignification need to take into account environmental aspects as well as end-product generation. Ambient temperature processes (20-30° C.) are highly desirable as they do not require energy intensive inputs. However, to carry out delignification operations at low temperatures and atmospheric pressure, strong acids are typically required. The strength of the acids used, while sufficient to remove lignin present on the lignocellulosic feedstock, can be deleterious to the lignin as it decomposes it beyond any lignin monomers which would be useable in other industries or applications, and can also damage the cellulose being yielded and therefore fail in delivering useable products from said feedstock.

One approach is to modify the acid by incorporating a modifying agent which tempers its reactivity and allows for more controlled/controllable reaction with the lignocellulosic feedstock. According to a preferred embodiment of the present invention, this step will allow for far more control in preventing cellulosic degradation from exposure to the acid systems. However, the presence of a modifying agent will not necessarily prevent the extensive depolymerization of lignin as it is being separated from the cellulose and hemicellulose.

Biofuel production is another potential application for the Kraft process. One of the current drawbacks of biofuel production is that it typically requires the use of food grade plant parts (such as seeds) in order to transform the easily accessible carbohydrates into fuel in a reasonably efficient process. The carbohydrates could be obtained from cellulosic fibres by using non-food grade biomass in the Kraft process; however, the energy intensive and destructive nature of the Kraft process for delignification makes this a less commercially viable option. In order to build a plant based chemical resource cycle there is a great need for energy efficient processes which can utilize plant-based feedstocks that do not compete with human food sources and which are generally inexpensive to produce.

Research (HUNTLEY, C. "Influence of Strong Acid Hydrolysis Processing on the Thermal Stability and Crystallinity of Cellulose Isolated from Wheat Straw", 2014) has shown that extraction of cellulose from an agricultural waste product such as wheat straw using strong acid hydrolysis such as sulfuric and nitric acids will yield similar crystalline and thermal properties as currently reported in the literature. However, the effect of various strong acids on the polymeric, structural, and thermal properties of cellulose extracted from wheat straw impacted the crystallinity of the end product cellulose and it was found to be desirable to use weaker acids where the crystallinity of the final cellulose product is of importance.

In addition to the recovery of cellulose, the recovery of lignin is increasingly important. Most conversion technologies relating to dissolved lignin use heat and metal catalysts to effectively break down lignin into low molecular weight aromatics which hold value for other uses/applications across industry. Some of the considerations to take into account when exploring various processes include: efficiency of the catalysts used, the stability of the catalysts, and control of the condensation and repolymerization reactions of lignin. The condensation and repolymerization of lignin often yield products which cannot be broken down easily using the conventional approaches and therefore lose a tremendous amount of value in terms of future uses/applications in industry. The condensation and repolymerization of lignin has a direct impact on the recovery of target lignin products (such as low molecular weight phenolic compounds). Thus, avoiding the condensation and repolymerization reactions is critical in order to maximize the yields of the target products.

While the Kraft pulping process is the most widely used chemical pulping process in the world, it is extremely energy intensive and has other drawbacks, for example, substantial odours emitted around pulp producing plants or general emissions that are now being highly regulated in many pulp and paper producing jurisdictions as well as being destructive to many of the commercially important constituents of the plant matter. In light of the current environmental challenges, economic challenges and climatic changes, along with emission fees being implemented by governments, it is highly desirable to optimize the current pulping processes in order to provide at least linear quality fibres without the current substantial detriment to the environment during the production thereof. Kraft process produces fibres still requiring multi-step bleaching process' for use in paper (Brownstock). These process' use multiple steps typically including a number of chlorite/chlorine additions.

Accordingly, there still exists a need for a composition capable of performing delignification on lignocellulosic biomass under reduced temperatures and pressures versus what is currently in use without requiring any major additional capital expenditures, and adapted to preserve the lignocellulosic biomass constituents as much as possible for further applications. In addition, when heat and pressure are removed from the process the capital expenditures are greatly reduced as plastics, such as high-density polyethylene (HDPE) can be utilized versus metals for piping, reactors and associated equipment.

There are two common processes used in the pulp and paper industry to produce pulp out of plant biomass which are the Kraft and the sulfite process. Both processes are very energy intensive and produce a large amount of harmful contaminated waste water. There are high temperatures and pressures applied to separate lignin from cellulose. A by-product of these processes is the so-called liquor which contains organic substances that result from partial depolymerization of lignin, hemicellulose and cellulose. These depolymerization products need to be separated from the liquor by distillation or extraction. Another method of separation is the change in solubility by adding another solvent to the liquor in a way that the substances become insoluble and can be filtered out as solids.

US patent application number 2003/0210957A1 discloses a method of treatment of a material contaminated with an organic compound. It is stated that the method includes treating the contaminant with a chemical oxidation step. The chemical oxidation step includes treating the contaminant with a transition metal in soluble form in combination with a chelator of the transition metal to form a transition metal:chelator complex, an oxidizing agent that provides a reactive free radical in the presence of the transition metal complex, and a buffering compound in order to maintain the pH in a neutral range. The method of treatment further includes contacting the contaminant with a microbial consortium under conditions suitable for the consortium to mediate solubilization or biodegradation of the organic compound or the reaction products thereof.

U.S. Pat. No. 5,850,086A teaches iron complexes for bleach activation and stereospecific oxidation. It states that a bleach and oxidation catalyst is provided comprising a catalytically active iron complex which can activate hydrogen peroxide or peroxy acids, for example.

In light of the current environmental challenges, economical challenges and climactic changes, along with emission fees being implemented, it is highly desirable to develop pulping processes which take into account those environmental challenges without impacting the price of the end products. Accordingly, there still exists a need for a composition capable of performing delignification on wood substance under reduced temperatures and pressures versus what is currently in use without requiring any additional capital expenditures.

In light of the state of the prior art, there still exists a need for a composition capable of performing delignification on lignocellulosic biomass under reduced temperatures and pressures versus what is currently in use without requiring any major additional capital expenditures.

SUMMARY OF THE INVENTION

The approach to modify the acid by incorporating a modifying agent which tempers its reactivity and allows for more controlled/controllable reaction with the lignocellulosic feedstock. According to a preferred embodiment of the present invention, this step will allow for far more control in preventing cellulosic degradation from exposure to the acid systems.

According to an aspect of the present invention, there is provided a composition comprising:
   an acid;
   a modifiying agent selected from the group consisting of: sulfamic acid; imidazole; N-alkylimidazole derivative; taurine; a taurine derivative; a taurine-related compound; alkylsulfonic acid; arylsulfonic acid; triethanolamine; and combinations thereof;
   a metal oxide; and
   a peroxide.

According to a preferred embodiment of the present invention, the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

Preferably, the alkysulfonic acid is selected from the group consisting of: methanesulfonic acid; ethanesulfonic acid; and combinations thereof.

Preferably, the arylsulfonic acid is selected from the group consisting of: toluenesulfonic acid; benzenesulfonic acid; and combinations thereof.

According to a preferred embodiment of the present invention, the acid and the metal oxide are present in a molar ratio ranging from 1:1 to 100:1. Preferably, the acid and the metal oxide are present in a molar ratio ranging from 20:1 to 100:1. More preferably, the acid and the modifying agent are present in a molar ratio ranging from 1:1 to 10:1.

According to a preferred embodiment of the present invention, the metal oxide is selected from the group consisting of: $TiO_2$; $Fe_2O_3$; ZnO; $Al_2O_3$; $SiO_2$; $ZrO_2/Y_2O_3$; $WO_3$; SnO; $Bi_2O_3$; and combinations thereof. Preferably, the metal oxide is selected from the group consisting of: $TiO_2$; $Al_2O_3$; $SiO_2$; and combinations thereof.

According to a preferred embodiment of the present invention, the acid and the modifying agent are present in a molar ratio ranging from 1:1 to 5:1. Preferably, the acid and the modifying agent are present in a molar ratio ranging from 1:1 to 3:1.

According to a preferred embodiment of the present invention, the acid is sulfuric acid.

According to an aspect of the present invention, there is provided a method of delignification of plant material, said method comprising:
   providing said plant material comprising cellulose fibres and lignin;
   exposing said plant material requiring to a composition comprising:
      an acid;
      a modifying agent selected from the group consisting of: imidazole; taurine; a taurine derivative; a taurine-related compound; alkylsulfonic acid; arylsulfonic acid; triethanolamine; and combinations thereof;
      a metal oxide; and
      a peroxide;
   for a period of time sufficient to remove substantially all (at least 80%) of the lignin present on said plant material.

Preferably, the amount of lignin removed is more than 90%. More preferably, the amount of lignin removed is more than 95%.

Preferably, the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

According to an aspect of the present invention, there is provided a one-pot process to separate lignin from a lignocellulosic feedstock, said process comprising the steps of:
   providing a vessel;
   providing said lignocellulosic feedstock;
   providing a composition comprising;
      an acid;
      a modifiying agent selected from the group consisting of: imidazole; taurine; a taurine derivative; a taurine-related compound; alkylsulfonic acid; arylsulfonic acid; triethanolamine; and combinations thereof;
      a metal oxide; and
      a peroxide;
   exposing said lignocellulosic feedstock to said composition in said vessel for a period of time sufficient to remove substantially all of the lignin present said lignocellulosic feedstock;
   optionally, removing a liquid phase comprising dissolved lignin fragments from a solid phase comprising cellulose fibres.

Preferably, composition further comprises a modifying agent selected from the group consisting of: imidazole; taurine; alkylsulfonic acid; arylsulfonic acid; triethanolamine; and combinations thereof.

Preferably, the alkysulfonic acid is selected from the group consisting of: methanesulfonic acid; ethanesulfonic acid; sulfamic acid and combinations thereof.

Preferably, the arylsulfonic acid is selected from the group consisting of: toluenesulfonic acid; benzenesulfonic acid; and combinations thereof.

According to a preferred embodiment of the present invention, the temperature of the composition prior to the step of exposing it to the lignocellulosic feedstock is below 50° C. Preferably, the temperature of the composition prior to the step of exposing it to the lignocellulosic feedstock is below 40° C. More preferably, the temperature of the composition prior to the step of exposing it to the lignocellulosic feedstock is below 30° C. Even more preferably, the temperature of the composition prior to the step of exposing it to the lignocellulosic feedstock is below 25° C.

Delignification at low temperatures and at atmospheric pressure typically requires very potent compositions in order to effectively and substantially remove lignin from lignocellulosic feedstock. Ultimately, there are a wide array of industrial and consumer products which can use varying qualities of cellulose (i.e. cellulose with different amounts of bound lignin). Cardboard products, for example, contain residual amount of lignin which can reach upwards of 20%. Hence, complete delignification is not always necessary when processing lignocellulosic feedstock. Higher end cellulosic products, such as those used in the pharmaceutical industry, require more complete delignification of lignocellulosic feedstock but the volume amounts of those types of products are generally lower than for cardboards and other bulk transport applications (such as heavy paper and the like).

Nevertheless, lignin as well as lignin monomers have become a valuable by-product of the processing of lignocellulosic feedstock and rather than being burned simply as a source of heat, most often used in the processing of said feedstock, it can be incorporated into the chemical industry as a source of starting material in chemical synthesis for example, creating a very viable and valuable alternative for the chemical industry now dependent on hydrocarbon sources. It is for this reason that it is highly desirable to maintain as complete as possible, the integrity of lignin monomers (paracoumaryl alcohol, coniferyl alcohol and sinapyl alcohol) upon their separation from cellulose and hemicellulose. The separation of lignin from the cellulose and hemicellulose involves the depolymerization or chain structure breakdown of the lignin into its monomers and/or oligomers.

DESCRIPTION OF THE INVENTION

The experiments carried out using an aqueous acidic composition according to a preferred embodiment of the present invention has shown that wood chips can undergo delignification under controlled reaction conditions and eliminate, or at least minimize, the degradation of cellulose as well as provide lignin depolymerization products which are soluble (i.e. separated from cellulose). Degradation of cellulose is understood to mean a darkening of cellulose, which is symbolic of an uncontrolled acid attack on the cellulose and oxidization thereof.

According to a preferred embodiment of the present invention, there is a composition comprising an acid, a source of peroxide (includes all forms of peroxide, i.e. hydrogen peroxide, peroxide salts (organic and inorganic), peracids etc.) and a metal oxide which when used during a process to delignify biomass can achieve results of complete removal of lignin with loss of only 20% of the cellulose fibre mass under conditions of atmospheric pressure and room temperature. Preferably, the process can yield cellulose with only a 15% loss in the fibre mass. More preferably, the process can yield cellulose with only a 10% loss in the fibre mass. Even more preferably, the process can yield cellulose with only a 5% loss in the fibre mass.

According to another preferred embodiment, the reaction phase comprises a modified mineral acid and a source of peroxide. Preferably, the modified acid is created by combining a mineral acid such as sulfuric acid with a compound comprising an amine moiety and a sulfonic acid moiety selected from the group consisting of: taurine and derivatives thereof such as taurine-related compounds; wherein the sulfuric acid and said amine-containing compound are present in a mole ratio ranging from 3:1 to 100:1. More preferably, the sulfuric acid and said compound comprising an amine moiety and a sulfonic acid moiety are present in a mole ratio ranging from 3:1 to 50:1. Even more preferably, the sulfuric acid and said compound comprising an amine moiety and a sulfonic acid moiety are present in a mole ratio ranging from 3:1 to 10:1.

Preferably, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates. According to another preferred embodiment, the modifying agent is selected from the group consisting of: sulfamic acid; aminomethanesulfonic acid; aminopropanesulfonic acid; aminobutanesulfonic acid; aminopentanesulfonic acid; aminohexanesulfonic acid; and combinations thereof.

Preferably, said modifying agent is a compound comprising an amine moiety and a sulfonic acid moiety is selected from the group consisting of: taurine; taurine derivatives; and taurine-related compounds. Preferably also, said taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; arylsulfonic acids; as well as aminoalkylsulfonic acids where the alkyl is selected from the group consisting of $C_1$-$C_5$ linear alkyl and $C_1$-$C_5$ branched alkyl. Preferably, the alkyl moiety in said linear alkylaminosulfonic acid is selected form the group consisting of: methyl; ethyl (taurine); propyl; and butyl. Preferably, the alkyl moiety in said branched aminoalkylsulfonic is selected from the group consisting of: isopropyl; isobutyl; and isopentyl.

According to another preferred embodiment of the present invention, the modifying agent comprises a compound containing an amine group and a compound comprising a sulfonic acid moiety. Preferably, the compound containing an amine group has a molecular weight below 300 g/mol. Also preferably, said compound containing an amine group has a molecular weight below 150 g/mol. More preferably, said compound containing an amine group is a secondary amine. Even more preferably, said compound containing an amine group is triethanolamine.

Preferably, said compound comprising a sulfonic acid moiety is selected from the group consisting of: alkylsulfonic acid; and arylsulfonic acid. More preferably, the arylsulfonic acid is selected from the group consisting of: orthanilic acid; metanilic acid; sulfanilic acid; benzenesulfonic acid; and toluenesulfonic acid.

EXAMPLES

The composition according to a preferred embodiment of the present invention used in the delignification test was prepared by dissolving 1 molar equivalent of taurine into sulfuric acid and subsequently adding hydrogen peroxide. Once this step was completed, a metal oxide was added to the composition to obtain a modified Caro's acid composition with a metal compound.

The compositions had densities between 1.1 and 1.8 g/cm$^3$. One of the advantages of the composition used in the process according to the present invention was the decreased reactivity of the composition as it is being prepared and upon exposure to the lignocellulosic feedstock.

Preferably, the metal compound is incorporated into the aqueous acid composition to function as a catalyst accelerating the lignin depolymerization.

When performing delignification of wood using a composition according to a preferred embodiment of the present invention, the process can be carried out at substantially lower temperatures than temperatures used in the conventional Kraft pulping process. The advantages are substantial, here are a few: the Kraft pulping process requires temperatures in the vicinity of 176-180° C. in order to perform the delignification process, a preferred embodiment of the process according to the present invention can delignify wood at far lower temperatures, even as low as 15° C. According to a preferred embodiment of the present invention, the delignification of wood can be performed at temperatures as low as 30° C. According to another preferred embodiment of the present invention, the delignification of wood can be performed at temperatures as low as 40° C. According to yet another preferred embodiment of the present invention, the delignification of wood can be performed at temperatures as low as 50° C. According to yet another preferred embodiment of the present invention, the delignification of wood can be performed at temperatures as low as 60° C. Other advantages include: a lower input of energy, reduction of emissions and reduced capital expenditures, reduced maintenance, lower shut down/turn around costs/scalability/ lower technical support requirements/fewer permitting challenges or requirements vs large Kraft process facilities/small footprint—land requirements/less pollution (chlorine or sulfite containing compounds are not used in the process according to the present invention)/recycling of chemicals; also, there are HSE advantages compared to conventional Kraft pulping compositions.

Moreover, the Kraft process uses high pressures to perform the delignification of wood which is initially capital intensive, dangerous, expensive to maintain and has high associated turn-around costs. According to a preferred embodiment of the present invention, the delignification of wood can be performed at atmospheric pressure. This, in turn, circumvents the need for highly specialized and expensive industrial equipment such as pressure vessels/digestors. It also allows the implementation of delignification units in many of parts of the world where the implementation of a Kraft plant would previously be impracticable due to a variety of reasons.

In each one of the above preferred embodiments, the temperature at which the processes are carried out are substantially lower than the current energy-intensive Kraft process which correlates to increased commercial viability, lower pollution, less investment and infrastructure requirements etc.

Some of the advantages of a process according to a preferred embodiment of the present invention over a conventional Kraft process are substantial as the heat/energy requirement for the latter is not only a great source of pollution but is in large part the reason the resulting pulp product is so expensive and has high initial capital requirements. The energy savings in the implementation of a process according to a preferred embodiment of the present invention would be reflected in a lower priced pulp and environmental benefits which would have both an immediate impact and a long-lasting multi-generational benefit for all.

Further cost savings in the full or partial implementation of a process according to a preferred embodiment of the present invention, can be found in the absence or minimization of restrictive regulations for the operation of a high temperature and high-pressure pulp digestors.

According to an aspect of the present invention, various degrees of cellulose crystallinity depending on the intended use of the cellulose can be achieved. For example, it may be advantageous to produce mostly amorphous cellulose fibres (intended for ethanol production, for example) or highly crystalline cellulose (intended for pharmaceutical industry application, as example).

Experiment #1

A preferred embodiment of the composition according to the present invention was tested to determine its ability to delignify a wood chip.

Commercially available lignin (Sigma-Aldrich; Lignin, Kraft; Prod #471003) was also used as a control in the testing.

Commercially available cellulose (Sigma-Aldrich; Cellulose, fibres (medium); Prod #C6288) was also used as a control in the testing.

The ability of a composition to remove lignin from a wood sample was evaluated by performing a number of experiments with varying molar ratios of several components. A desirable result is one which dissolves all of the lignin in the wood and leaves behind only high-quality cellulose. The ability of the tested composition to remove lignin was evaluated against a sample of lignin as well as a sample of cellulose fibres. Ideally, a composition must not dissolve/destroy more than 20% of the cellulose present in the sample. Preferably, a composition must not dissolve more than 15% of the cellulose present in the sample. More preferably, a composition must not dissolve more than 10% of the cellulose present in the sample. Ideally as well, a treated sample of wood should not contain more than 20% by mass of residual lignin. Preferably, a treated sample of wood should not contain more than 10% by mass of residual lignin. More preferably, a treated sample of wood should not contain more than 5% by mass of residual lignin.

Wood pellets were utilized as the feedstock that were processed through a mill to yield product that were predominantly smaller than 2 mm. Also incorporated as a feedstock were walnut shells (typically consumed for sandblasting (12-20 grit) or burned) as well as pure pine shavings as well as hemp straw, alfalfa straw, wheat straw, peanut shells and mill feed. All of these items are common, widely available feedstocks and are typically not converted to a commercially viable product in scale.

Compositions were prepared by the sequential addition of a modifying agent, a peroxide source and a metal oxide compound to a mineral acid such as sulfuric acid.

The compositions are solutions of pH<0; densities are between 1.1 and 1.8 g/cm$^3$; the blends decompose when heating, so boiling points have not yet been established.

Delignification Testing

Compositions according to preferred embodiment of the present invention were tested to determine their ability to separate the lignin from a sample of a lignocellulosic material, in this case, wood. The experiments were carried out using two controls, lignin and cellulose, in order to assess the impact of each composition on each of those components separately and independently. The results from a first series of experiments where various metal oxides are tested with the molar ratios of each component of the composition are reported in Table 1 below.

TABLE 1

Results of the delignification reactions carried out at room temperature under atmospheric pressure using sulfuric acid and hydrogen peroxide and taurine (as a modifying agent) in the presence of various metal oxides

| | Blend | recovery [mass %] | | |
|---|---|---|---|---|
| | ($H_2SO_4$:PO:MOD:MO) | wood | lignin | cellulose |
| no MO | 10:10:3:0 | 39 | 0 | 93 |
| $TiO_2$ | Ti-10:10:3:1 | 31 | 0 | 74 |
| $Fe_2O_3$ | Fe-10:10:3:1 | 33 | 0 | 69 |
| ZnO | Zn-10:10:3:1 | 45 | 0 | 93 |
| $Al_2O_3$ | Al-10:10:3:1 | 48 | 0 | 84 |

TABLE 1-continued

Results of the delignification reactions carried out at room temperature under atmospheric pressure using sulfuric acid and hydrogen peroxide and taurine (as a modifying agent) in the presence of various metal oxides

| | Blend | recovery [mass %] | | |
|---|---|---|---|---|
| | ($H_2SO_4$:PO:MOD:MO) | wood | lignin | cellulose |
| $SiO_2$ | Si-10:10:3:1 | 43 | 0 | 86 |
| $ZrO_2/Y_2O_3$ | Zr/Yt-10:10:3:1 | 34 | 0 | 57 |
| $WO_3$ | W-10:10:3:1 | 30 | 0 | 81 |
| SnO | Sn-10:10:3:1 | 170 | 32 | 210* |
| $Bi_2O_3$ | Bi-10:10:3:1 | 65 | 15 | 112* |

*Indicates the presence of metal oxide in the cellulose PO indicates peroxide, MOD indicates modifying agent, MO indicates metal oxide.

Also tested were vanadium oxide, copper oxide and sodium silicate which did not have satisfactory results. Both the vanadium oxide and the copper oxide created an unstable blend when the metal oxide was added to the modified acid—peroxide composition. They reacted with $H_2O_2$ upon mixing, triggering runaway decomposition reaction. The reaction with sodium silicate was not successful.

The data obtained from a series of control experiments using a modified sulfuric acid with a peroxide but without a metal oxide where compared to a number of other compositions comprising various metal oxides to carry out the delignification of a lignocellulosic material at room temperature under atmospheric pressure.

The results from a second series of experiments with a modifier where the molar ratios of some of the previously tested metal oxide were reduced 100-fold are reported in Table 2 below.

TABLE 2

Results of the delignification reactions carried out at room temperature under atmospheric pressure using sulfuric acid and hydrogen peroxide and taurine (as a modifying agent) in the presence of various metal oxide

| Blend | Recovery (mass %) | | | Comment/ |
|---|---|---|---|---|
| ($H_2SO_4$:PO:MOD:MO) | wood | lignin | cellulose | observation |
| Al-10:10:3:0.01 | 67 | 12 | 103 | MO in Cellulose |
| Zn-10:10:3:0.01 | 47 | 16 | 96 | |
| Ti-10:10:3:0.01 | 51 | 7 | 125 | MO in Cellulose |

The data obtained from a second series of experiments and reported in Table 2 above, clearly establish that a composition comprising sulfuric acid with a modifier (taurine), a source of peroxide ($H_2O_2$) and a metal oxide (at very low concentration—0.01) can provide for substantial delignification of a lignocellulosic material when such operation is carried out at room temperature under atmospheric pressure.

The testing revealed that the reactions were conducted faster than the control experiment. The yield of wood is the best indication of rate of reaction (lower yield=faster reaction). Titanium, iron, tungsten, and zirconium/yttrium oxides had lower yields, therefore they were faster.

However, if one of these metal oxides (MO) showed specificity also for cellulose in any amount, then the colour of wood matters. Some MO's gave low yields but orange colored wood which can be undesirable in some applications. This obvious colour change (or delignification) as well as specificity (lignin over cellulose removal) was the metric when choosing millimolar-MO samples.

On the basis of the results from the testing which was carried out, it is expected that such compositions could be used on a wide variety of lignocellulosic plants and waste material in the removal of lignin and separation thereof from cellulosic material in such a way as to utilize equipment and processes which do not require high pressures and/or high temperatures. This allows for considerable amount of flexibility for the implementation of large-scale operations employing such processes as well as substantially smaller investments as the engineering complexities are greatly reduced because of the parameters under which the processes can be carried out. In addition to the greatly minimized capital expenditures, reduced technical complexities, pollution by-products reduction (or elimination), scalability utilizing existing infrastructure is viable resulting in further reductions of capital requirements.

The above experiment is a clear indication that the composition according to the present invention not only provides an adequate technology to delignify plant material and/or woody biomass waste, but is also valuable in controlling the ultimate degradation of cellulosic material into carbon black residue common in the Kraft process resulting in higher yields and qualities for industry thus increasing profitability while reducing emissions and the risk to the employees, contractors, and public.

A method to yield glucose from wood pulp would represent a significant advancement to the current process where the conversion of such is chemical and energy intensive, costly, emissions intensive and dangerous, all while not resulting in highly efficient results, especially in large-scale operations. It is desirable to employ a composition which can delignify lignocellulosic biomass but also allows industry a level of control in order to preserve the commercially valuable cellulose rather than degrading it to a non-commercial carbon black product resulting in higher efficiencies, increased profitability and yields along with increased safety and reduced overall costs. Preferably, said composition used under appropriate conditions can also generate highly crystalline cellulose. The crystallinity of cellulose can be assessed by methods such as X-ray diffraction. Preferably, a composition according to the present invention can generate cellulose which has a crystallinity level above 60%.

Analysis of the Cellulose Extracted

The cellulose recovered from the series of experiments was analyzed under X-ray diffraction in order to assess the crystallinity of the product. The crystallinity is calculated by the peak deconvolution method. The results of the analysis are reported below in Table 3.

TABLE 3

Results of the XRD of various samples of cellulose recovered from the process according to a preferred embodiment of the present invention

| Sample # | Crystallinity in % |
|---|---|
| Sample 1 | 64.6 |
| Sample 2 | 62.9 |
| Sample 3 | 66.3 |
| Sample 4 | 64.2 |
| Sample 5 | 63.2 |

Sample #2 is a commercially available micromystalline cellulose.

According to a preferred embodiment of the method of the present invention, the separation of lignin can be realized and the resulting cellulose fibres can be further processed to yield glucose monomers. Glucose chemistry has a multitude of uses including as a starting block in the preparation of widely used chemicals, including but not limited to, diacetonide, dithioacetal, glucoside, glucal and hydroxyglucal to name but a few.

The embodiments described herein are to be understood to be exemplary and numerous modification and variations of the present invention are possible in light of the above teachings. It is therefore to be understood that within the scope of the claims appended hereto, the invention may be practiced otherwise than as specifically disclosed herein.

The invention claimed is:

1. A composition comprising:
   an acid;
   a modifying agent selected from the group consisting of: sulfamic acid; imidazole; N-alkylimidazole derivative; taurine; a taurine derivative; a taurine-related compound; alkylsulfonic acid; arylsulfonic acid; triethanolamine; and combinations thereof;
   a metal oxide; and
   a peroxide.

2. The composition according to claim 1, wherein the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

3. The composition according to claim 1, wherein the alkysulfonic acid is selected from the group consisting of: methanesulfonic acid; ethanesulfonic acid; and combinations thereof.

4. The composition according to claim 1, wherein the arylsulfonic acid is selected from the group consisting of: orthanilic acid; metanilic acid; sulfanilic acid; toluenesulfonic acid; benzenesulfonic acid; and combinations thereof.

5. The composition according to claim 1, wherein the acid and the metal oxide are present in a molar ratio ranging from 1:1 to 100:1.

6. The composition according to claim 1, wherein the acid and the metal oxide are present in a molar ratio ranging from 20:1 to 100:1.

7. The composition according to claim 1, wherein the acid and the modifying agent are present in a molar ratio ranging from 1:1 to 10:1.

8. The composition according to claim 1, wherein the acid and the modifying agent are present in a molar ratio ranging from 1:1 to 5:1.

9. The composition according to claim 1, wherein the acid and the modifying agent are present in a molar ratio ranging from 1:1 to 3:1.

10. The composition according to claim 1, wherein the acid is sulfuric acid.

11. The composition according to claim 1, wherein the metal oxide is selected from the group consisting of: $TiO_2$; $Fe_2O_3$; $ZnO$; $Al_2O_3$; $SiO_2$; $ZrO_2/Y_2O_3$; $WO_3$; $SnO$; $Bi_2O_3$; and combinations thereof.

12. The composition according to claim 1, wherein the metal oxide is selected from the group consisting of: $TiO_2$; $Al_2O_3$; $SiO_2$; and combinations thereof.

13. A one-pot process to separate lignin from a lignocellulosic feedstock, said process comprising the steps of:
   providing a vessel;
   providing said lignocellulosic feedstock;
   providing a composition comprising;
   an acid;
   a modifying agent;
   a metal oxide; and
   a peroxide;
   exposing said lignocellulosic feedstock to said composition in said vessel for a period of time sufficient to remove at least 80% of the lignin present said lignocellulosic feedstock;
   optionally, removing a liquid phase comprising dissolved lignin fragments from a solid phase comprising cellulose fibres.

14. The process according to claim 13, wherein said acid is sulfuric acid.

15. The process according to claim 13, wherein said peroxide is hydrogen peroxide.

16. The process according to claim 13, wherein the period of time is sufficient to remove at least 90% of the lignin present on said plant material.

17. The process according to claim 13, wherein the temperature of the composition prior to the step of exposing it to the lignocellulosic feedstock is below 50° C.

18. The process according to claim 13 where the modifying agent is selected from the group consisting of: sulfamic acid; imidazole; N-alkylimidazole; taurine; a taurine derivative; a taurine-related compound; alkylsulfonic acid; arylsulfonic acid; triethanolamine; and combinations thereof.

19. The process according to claim 13 where the modifying agent is taurine derivative or taurine-related compound selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates.

20. The process according to claim 13 where the modifying agent is an alkysulfonic acid is selected from the group consisting of: methanesulfonic acid; ethanesulfonic acid; sulfamic acid and combinations thereof.

21. The process according to claim 13 where the modifying agent is an arylsulfonic acid is selected from the group consisting of: toluenesulfonic acid; benzenesulfonic acid; and combinations thereof.

22. The process according to claim 13 where the modifying agent comprises a compound containing an amine group and a compound comprising a sulfonic acid moiety.

23. The process according to claim 13, wherein the metal oxide is selected from the group consisting of: $TiO_2$; $Fe_2O_3$; ZnO; $Al_2O_3$; $SiO_2$; $ZrO_2/Y_2O_3$; $WO_3$; SnO; $Bi_2O_3$; and combinations thereof.

24. The process according to claim 13, wherein the metal oxide is selected from the group consisting of: $TiO_2$; $Al_2O_3$; $SiO_2$; and combinations thereof.

\* \* \* \* \*